US011941961B2

(12) United States Patent
Alessi et al.

(10) Patent No.: US 11,941,961 B2
(45) Date of Patent: *Mar. 26, 2024

(54) PRESENCE DETECTION DEVICE AND METHOD

(71) Applicant: STMicroelectronics S.r.l., Agrate Brianza (IT)

(72) Inventors: Enrico Rosario Alessi, Catania (IT); Fabio Passaniti, Syracuse (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

This patent is subject to a terminal disclaimer.

(21) Appl. No.: 17/823,709

(22) Filed: Aug. 31, 2022

(65) Prior Publication Data

US 2022/0415144 A1 Dec. 29, 2022

Related U.S. Application Data

(63) Continuation of application No. 17/207,073, filed on Mar. 19, 2021, now Pat. No. 11,462,086.

(30) Foreign Application Priority Data

Apr. 15, 2020 (IT) ........................ 102020000007942

(51) Int. Cl.
*G08B 13/19* (2006.01)
*G08B 13/22* (2006.01)

(52) U.S. Cl.
CPC ............. *G08B 13/19* (2013.01); *G08B 13/22* (2013.01)

(58) Field of Classification Search
CPC ........ G06B 13/19; G08B 13/22; G08B 29/26; G08B 13/2494; G08B 13/191; G08B 13/26; G01V 9/005
See application file for complete search history.

(56) References Cited

U.S. PATENT DOCUMENTS 4,833,450 A 5/1989 Buccola et al.
6,188,318 B1 2/2001 Katz et al.
(Continued)

FOREIGN PATENT DOCUMENTS

CN 106650704 A 5/2017
EP 2533219 A1 12/2012
(Continued)

OTHER PUBLICATIONS

Amoruso, V., et al. "An Improved Model of Man for ESD Application", Journal of Electrostatics, 49, http://dx.doi.org/10.1016/S0304-3886(00)00020-6, Apr. 17, 2000, 20 pages.
(Continued)

*Primary Examiner* — Kerri L McNally
(74) *Attorney, Agent, or Firm* — Slater Matsil, LLP

(57) ABSTRACT

In accordance with an embodiment, a detection device includes: an infrared temperature sensor configured to provide a temperature signal associated with an heat emission of at least one individual within a monitored area; an electrostatic-charge-variation sensor configured to provide a charge-variation signal indicative of a variation of electrostatic charge associated with the at least one individual; and a processing unit, coupled to the infrared temperature sensor and to the electrostatic-charge-variation sensor, the processing unit configured to detect a presence of the at least one individual within the monitored area by receiving the temperature signal and the charge-variation signal, and jointly processing the temperature signal and charge.

21 Claims, 4 Drawing Sheets

(56) References Cited

U.S. PATENT DOCUMENTS

| | | | | |
|---|---|---|---|---|
| 7,489,024 | B2 | 2/2009 | Socher et al. | |
| 2002/0030594 | A1 | 3/2002 | Inaba et al. | |
| 2005/0231353 | A1* | 10/2005 | DiPoala | G08B 29/183 340/567 |
| 2006/0092022 | A1* | 5/2006 | Cehelnik | G01V 3/088 340/561 |
| 2006/0158173 | A1 | 7/2006 | Takiguchi | |
| 2014/0232516 | A1 | 8/2014 | Stivoric et al. | |
| 2016/0195630 | A1 | 7/2016 | Aponte Luis | |
| 2016/0342781 | A1 | 11/2016 | Jeon | |
| 2021/0232227 | A1 | 7/2021 | Passaniti et al. | |

FOREIGN PATENT DOCUMENTS

| | | | |
|---|---|---|---|
| EP | 2980609 | A1 | 2/2016 |
| EP | 3190569 | A1 | 7/2017 |
| KR | 20110061750 | A | 6/2011 |

OTHER PUBLICATIONS

Ficker, T., “Electrification of Human Body by Walking”, Journal of Electrostatics, vol. 64, Issue 1, Jan. 2006, 7 pages.

Kurita, Koichi, “Development of non-contact measurement system of human stepping”, SICE Annual Conference, The University of Electro-Communications, Japan, Aug. 20-22, 2008, 4 pages.

* cited by examiner

PRESENCE DETECTION DEVICE AND METHOD

This application is a continuation of U.S. patent application Ser. No. 17/207,073, filed Mar. 19, 2021, which application claims the benefit of Italian Patent Application No. 102020000007942, filed on Apr. 15, 2020, which applications are hereby incorporated herein by reference in its entirety.

TECHNICAL FIELD

The present disclosure relates to a presence detection device and method.

BACKGROUND

Presence detection devices are known, used for identifying the presence of individuals in a monitored area, in particular in order to identify intrusions of unauthorized persons and consequently activate alarm signals (it is emphasized that other purposes may, however, be envisaged, for example for applications of energy saving, or of domestic or industrial automation).

Such devices envisage the use of suitable sensors for detecting the presence of individuals in the monitored area.

Known presence sensors include, for example, temperature sensors based on detection of radiation in the infrared (IR) range, of a passive type (the so-called PIR sensors), i.e., ones that react to variations in temperature in the area under surveillance; of an active type, i.e., ones designed to evaluate the interruption of an emitted ray between a point of emission and a point of reception; or of a thermal-image type, i.e., ones designed to detect the so-called thermogram of a subject, i.e., a temperature image or map associated with infrared radiation (IR) emitted by the body of the subject.

Other sensors of a known type include microwave sensors, which usually are used with PIR sensors in so-called “dual-technology” presence detectors. The microwave sensors detect the movement of objects, whereas PIR sensors detect the variation of heat; the combination of the two detections generates an alarm signal.

Known presence detection systems that use appropriate combinations of one or more of the aforementioned sensors, for example a combination of one or more infrared temperature sensors and one or more ultrasound sensors, are, for example, described in U.S. Pat. No. 6,188,318 B1 or in U.S. Publication No. 2005/231353 A1, the aim being to improve the efficiency of detection and reduce the number of false positives and/or false negatives.

Infrared temperature sensors are moreover known, in particular based on thermopiles, made with integrated technology of semiconductor materials, for example with complementary metal oxide semiconductor (CMOS) technology. These sensors in general comprise an array of detection elements (so-called pixels), each implementing a thermocouple or hot-cold junction (for example, obtained with an N+ doped region and a P+ doped region), which are formed starting from a same substrate of semiconductor material, for example silicon, so that the “cold” junctions are at a known temperature.

In a known manner, a thermopile sensor detects a difference in temperature ΔT between the respective detection elements; in particular, when the sensor is heated by incident infrared radiation, a voltage $V_T = N\alpha\Delta T$ is generated as a result of the Seebeck effect, being proportional to the difference in temperature ΔT between the elements of the thermocouple, to the Seebeck coefficient α and to the number of thermocouples N.

Even though in general presence detection devices of a known type may achieve satisfactory performance, these devices may have some drawbacks.

In particular, devices based on infrared temperature sensors are in general sensitive to environmental disturbance and to heating sources other than the individuals to be detected.

In this regard, FIG. 1A shows the plot of a temperature signal $S_T$ supplied by an infrared temperature sensor, in particular a sensor based on a thermopile made with CMOS technology, indicative of a temperature detected in a monitored area.

In particular, in the presence of at least one individual within the monitored area, and as long as the same individual remains within the same area before coming out, the temperature signal $S_T$ assumes, as a result of the heat emitted by the body of the individual, a value considerably higher than a so-called baseline level (corresponding to the value of the temperature signal $S_T$ in the absence of individuals in the monitored area, substantially due to the environmental heat in the same monitored area).

Therefore, by evaluating the difference between the value of the temperature signal $S_T$ and the baseline level and comparing this difference with a threshold of an appropriate value, a presence signal $S_P$ is generated, represented in FIG. 1B, which assumes a low value in the absence of individuals and a high value in the presence of at least one individual in the monitored area (this presence signal $S_P$ can then be used to cause, for example, generation of an anti-intrusion alarm).

In the presence of a larger number of individuals in the monitored area, the temperature signal $S_T$ assumes an even higher value with respect to the baseline level, with a relative increase proportional to the number of individuals present.

As mentioned previously, one drawback linked to this type of sensors is represented by the fact that the presence of a source of environmental heat that adds to the baseline level (for example, resulting from turning-on a radiator, stove, or similar heating element, in the case of domestic or indoor application) causes a significant variation in the temperature signal $S_T$, which may even be comparable with the variation associated with the presence of an individual, thus causing switching of the presence signal $S_P$ and a “false positive” in the presence detection.

It is known that a further drawback of devices based on infrared temperature sensors is represented by the fact that these devices are in general difficult to install and regulate.

In addition, systems based on microwave sensors are susceptible to the presence of objects made of metal material in the monitored area, which can act as a shield to the radiation emitted, creating “shadow areas” where detection is not possible. In general, minor movements, or even the presence of fluorescent light, are sufficient to cause generation of alarms (with a consequent possibility of false positives). Moreover, microwave sensors do not make a distinction between human beings and objects (for example, curtains, in indoor premises, or leaves or bushes in outdoor premises).

In general, in anti-intrusion systems, a further critical aspect is represented by the discrimination between pets and actual intruders; it is therefore possible for false alarms and consequent erroneous alarm signals to be generated.

The aim of the present solution is to overcome the drawbacks of the known art by providing a presence detection system, in particular for anti-intrusion purposes, having improved characteristics.

SUMMARY

In accordance with an embodiment, a detection device includes: an infrared temperature sensor configured to provide a temperature signal associated with an heat emission of at least one individual within a monitored area; an electrostatic-charge-variation sensor configured to provide a charge-variation signal indicative of a variation of electrostatic charge associated with the at least one individual; and a processing unit, coupled to the infrared temperature sensor and to the electrostatic-charge-variation sensor, the processing unit configured to detect a presence of the at least one individual within the monitored area by receiving the temperature signal and the charge-variation signal, and jointly processing the temperature signal and charge-variation signal.

In accordance with another embodiment, a method for detecting a presence of at least one individual within a monitored area includes: providing, by an infrared temperature sensor, a temperature signal associated with a heat emission of at least one individual within the monitored area; providing, by an electrostatic-charge-variation sensor, a charge-variation signal indicative of a variation of electrostatic charge associated with the at least one individual; and jointly processing the temperature signal and the charge-variation signal to detect a presence of the at least one individual within the monitored area.

In accordance with a further embodiment, a presence detection system comprises: an infrared sensor; an electrostatic-charge-variation sensor; and a processor configured to: extract features from charge variation signal provided by the electrostatic-charge-variation sensor, determine whether the extracted features match features associated with a human presence, determine a temperature difference of a temperature signal provided by the infrared sensor, determine whether the temperature difference is outside of a first temperature range, and generate a presence detection signal when the extracted features match features associated with the human presence and the temperature difference is outside of the first temperature range within a same time interval.

BRIEF DESCRIPTION OF THE DRAWINGS

For a better understanding of the invention, embodiments thereof are now described purely by way of non-limiting example and with reference to the attached drawings, wherein.

DETAILED DESCRIPTION OF ILLUSTRATIVE EMBODIMENTS

As will be described in detail hereinafter, one aspect of the present solution envisages, for detecting the presence of one or more individuals within a monitored area, a detection device based on the joint, or combined, use of an infrared temperature sensor and of an electrostatic-charge-variation sensor.

The present disclosure relates to a presence detection device and method for systems including, but not limited to, anti-intrusion systems.

In a known manner, the electric charge is a fundamental component of nature. The electric charge of an electrostatically charged body can be easily transferred to another body, in conditions of direct contact or at a distance. When the charge is transferred between two electrically insulated objects, a static charge is generated so that the object with an excess of electrons is negatively charged and the object with a deficit of electrons is positively charged. The displacement of charges is of a different nature, according to whether the object is a conductor or a dielectric. In a conductor, electrons are distributed throughout the material and are free to move, based on the influence of external electrical fields. In a dielectric, there are no electrons free to move, but electric dipoles, with random directions in space (therefore with a resulting zero net charge), which, however, can be oriented or deformed by means of an external electrical field, thus generating an orderly distribution of charges and therefore a polarization. The charge may in any case be mobile, according to the properties of the material and other environmental factors.

In the present solution, the electrostatic-charge-variation sensor of the detection device is configured to detect, via a capacitive detection, the variations of electrical field that arise as a result of the presence of an individual within a monitored area, due to transfer of charges from the body of the individual towards the ground.

In particular, the human body is conductive, and the electric charge is normally balanced; each step made by the individual generates an unbalancing in the electric charge of the body, thus causing a flow of charges, i.e., a current, for overall charge balancing. This electric current can therefore be detected (as described in detail hereinafter), for identifying the presence of the individual within the monitored area.

Figure 1A:
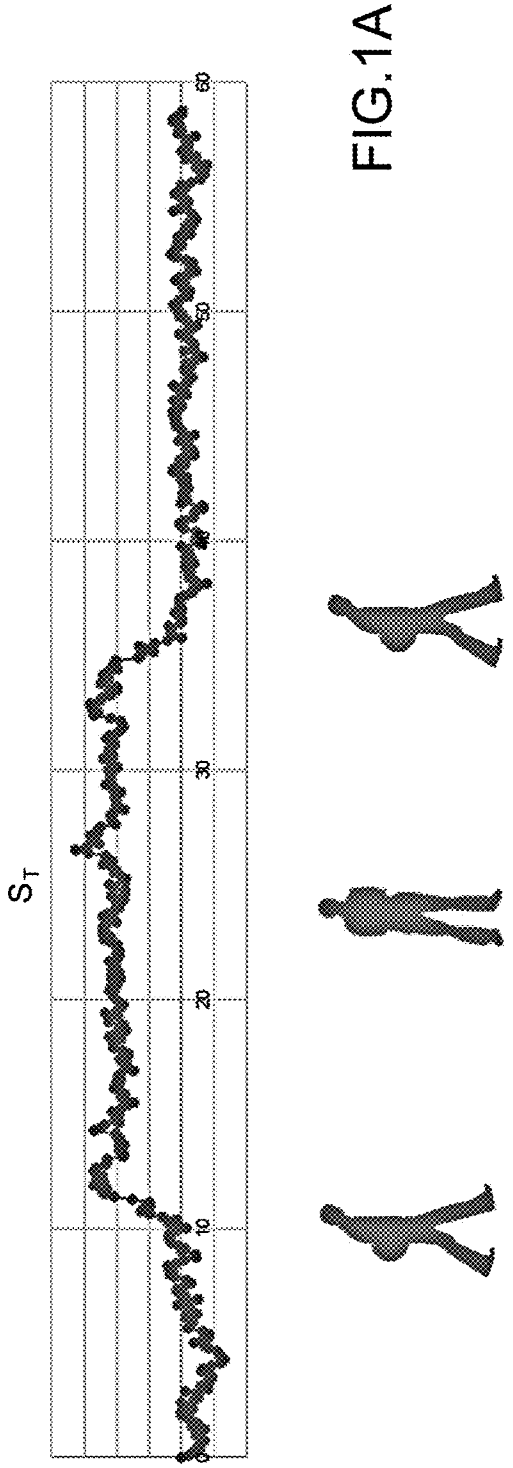
FIGS. 1A and 1B show plots of signals associated with presence detection in a presence detection system of a known type.
Figure 1B:
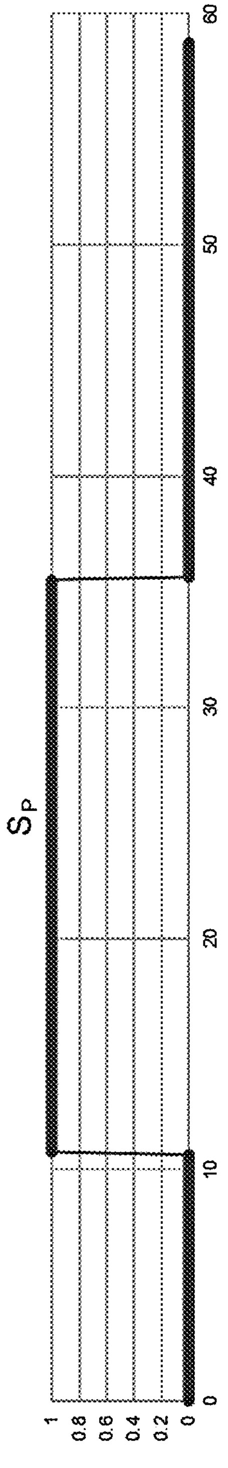
Figure 2:
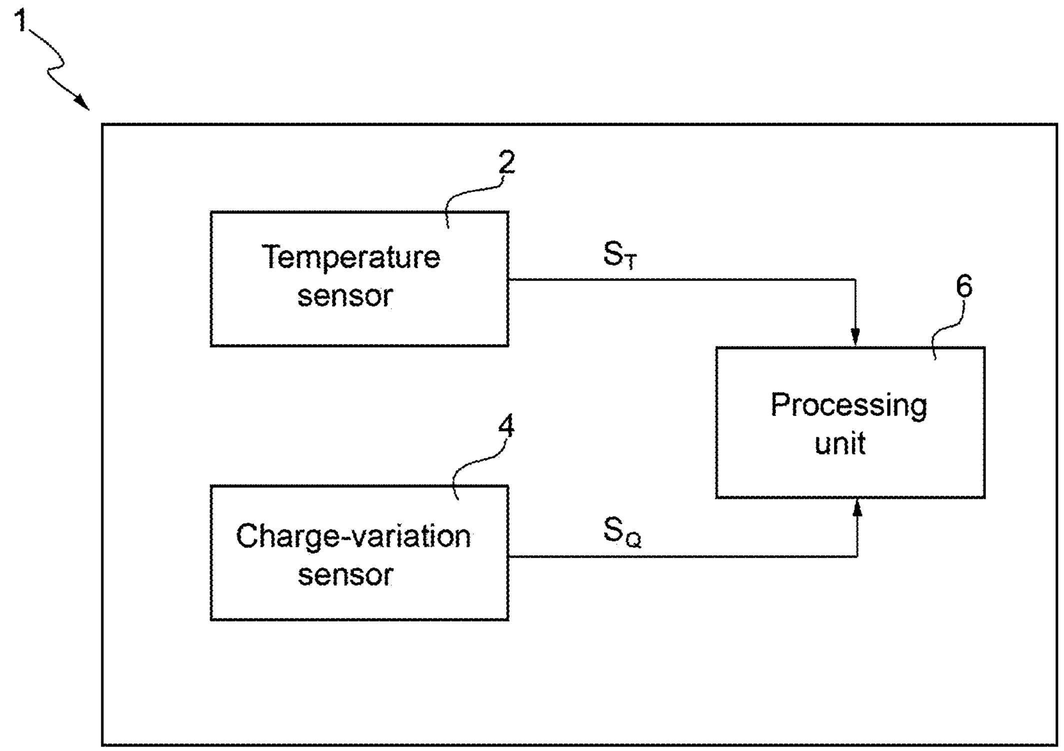
FIG. 2 is a schematic illustration of a detection device, according to one embodiment of the present solution.

FIG. 2 is a schematic illustration of a detection device 1 according to one embodiment of the present solution, which comprises:

- an infrared temperature sensor 2, in particular a thermopile-based sensor made with CMOS technology, of a per-se known type (not described in detail herein), configured to provide a temperature signal $S_T$, associated with the presence of an individual in a monitored area, as a function of the detected temperature (in particular, the variation of this temperature signal $S_T$ with respect to a baseline value may be used to generate a presence signal $S_P$, as discussed previously);
- an electrostatic-charge-variation sensor 4, which will be described in detail hereinafter, configured to provide a charge-variation signal $S_Q$ indicative of a variation of electrostatic charge associated with the presence of the individual; and

- a processing unit 6, which is coupled to the infrared temperature sensor 2 and to the electrostatic-charge-variation sensor 4 in order to receive the temperature signal $S_T$ and the charge-variation signal $S_Q$ and is configured to jointly process the aforementioned temperature signal $S_T$ and charge-variation signal $S_Q$ in order to detect the presence of at least one individual in the monitored area.

In particular, as on the other hand will be described in detail hereinafter, the processing unit 6 is configured to implement a "time AND" operation, in order to verify the simultaneous presence of a first and a second presence indication, provided on the basis of processing of the charge-variation signal $S_Q$ and of the temperature signal $S_T$, respectively.

In addition, the same processing unit 6 is configured to automatically adjust the baseline value of the temperature signal $S_T$ in a manner conditioned with respect to the processing of the charge-variation signal $S_Q$, in particular so as to enable updating of the baseline value only in the absence of individuals in the monitored area, so as to update it as a function of the actual environmental noise present in the same monitored area.

The processing unit 6 comprises, for example, a microcontroller, or a Machine Learning Core (MLC) processor resident in an Application-Specific Integrated Circuit (ASIC), coupled to the infrared temperature sensor 2 and to the electrostatic-charge-variation sensor 4 for processing the temperature signal $S_T$ and charge-variation signal $S_Q$. The aforementioned infrared temperature sensor 2, electrostatic-charge-variation sensor 4, and processing unit 6 may be made within a same package provided with appropriate electrical-connection elements towards the outside, for example for connection with a host electronic apparatus.

Figure 3:
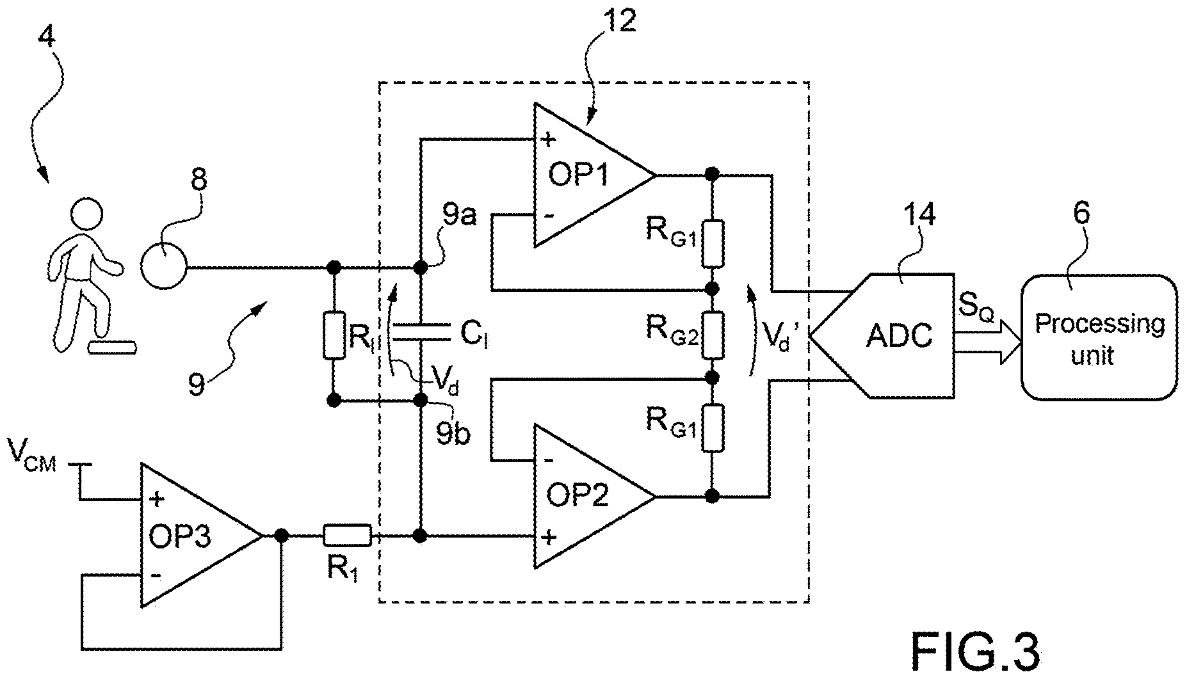
FIG. 3 illustrates a possible embodiment of an electrostatic-charge-variation sensor of the detection device of FIG. 2.

FIG. 3 illustrates an embodiment provided by way of non-limiting example of the electrostatic-charge-variation sensor 4, which comprises at least one input electrode 8, which is designed to be arranged facing, or in proximity of, the monitored area.

The input electrode 8 forms part of a differential input 9 of an instrumentation amplifier 12, being coupled to a corresponding first input terminal 9*a*.

An input capacitor $C_I$ and an input resistor $R_I$ are connected in parallel between the first input terminal 9*a* and a second input terminal 9*b* of the differential input 9.

During operation, an input voltage $V_d$ across the input capacitor $C_I$ varies due to process of electrical charge/discharge through the body of the individual, in particular due to contact with the ground and the resulting electric current. After a transient (the duration of which is given by the constant $R_I \cdot C_I$ defined by the parallel between the capacitor $C_I$ and the resistor $R_I$), the input voltage $V_d$ returns to its steady-state value.

The instrumentation amplifier 12 is basically constituted by two operational amplifiers OP1 and OP2, having non-inverting input terminals connected, respectively, to the first and second input terminals 9*a*, 9*b* and inverting terminals connected together by means of a gain resistor $R_{G2}$.

A biasing (buffer) stage OP3 biases the instrumentation amplifier 12 to a common-mode voltage $V_{CM}$, through a resistor $R_1$ coupled to the second input terminal 9*b*.

The output terminals of the operational amplifiers OP1 and OP2 are connected to the respective inverting input terminals by means of a respective gain resistor $R_{G1}$; an output voltage $V_d'$ is present between the output terminals.

As will be evident, the gain Ad of the instrumentation amplifier 12 is equal to $(1+2 \cdot R_1/R_2)$; therefore, the aforementioned output voltage $V_d'$ is equal to $V_d \cdot (1+2 \cdot R_1/R_2)$.

The components of the instrumentation amplifier 12 are chosen so that the instrumentation amplifier 12 will have a low noise and a high impedance (for example, of the order of 109Ω) in its passband (for example, comprised between 0 and 500 Hz).

The aforementioned output voltage $V_d'$ is provided at the input of an analog-to-digital converter (ADC) 14, which provides at the output the aforementioned charge-variation signal $S_Q$ for the processing unit 6. The charge-variation signal $S_Q$ is, for example, a high-resolution (16 or 24 bits) digital stream.

According to a different embodiment, if an analog-to-digital converter 14 with appropriate characteristics (e.g., differential input, high input impedance, high resolution, dynamic range optimized for the quantities to be measured, low noise) is available, the instrumentation amplifier 12 can be omitted, the input voltage $V_d$ being in this case directly supplied to the input of the analog-to-digital converter 14.

In a way not illustrated, the charge-variation signal $S_Q$ can be supplied to a first input of a multiplexer block, which can moreover receive on at least one further input the aforementioned temperature signal $S_T$ (and possibly, on further inputs, further detection signals). The output of the multiplexer block is in this case coupled to an input of the processing unit 6, supplying, sequentially in time, the aforementioned charge-variation and temperature signals $S_Q$, $S_T$ (and possibly further detection signals) for joint processing by the same processing unit 6.

Figure 4:
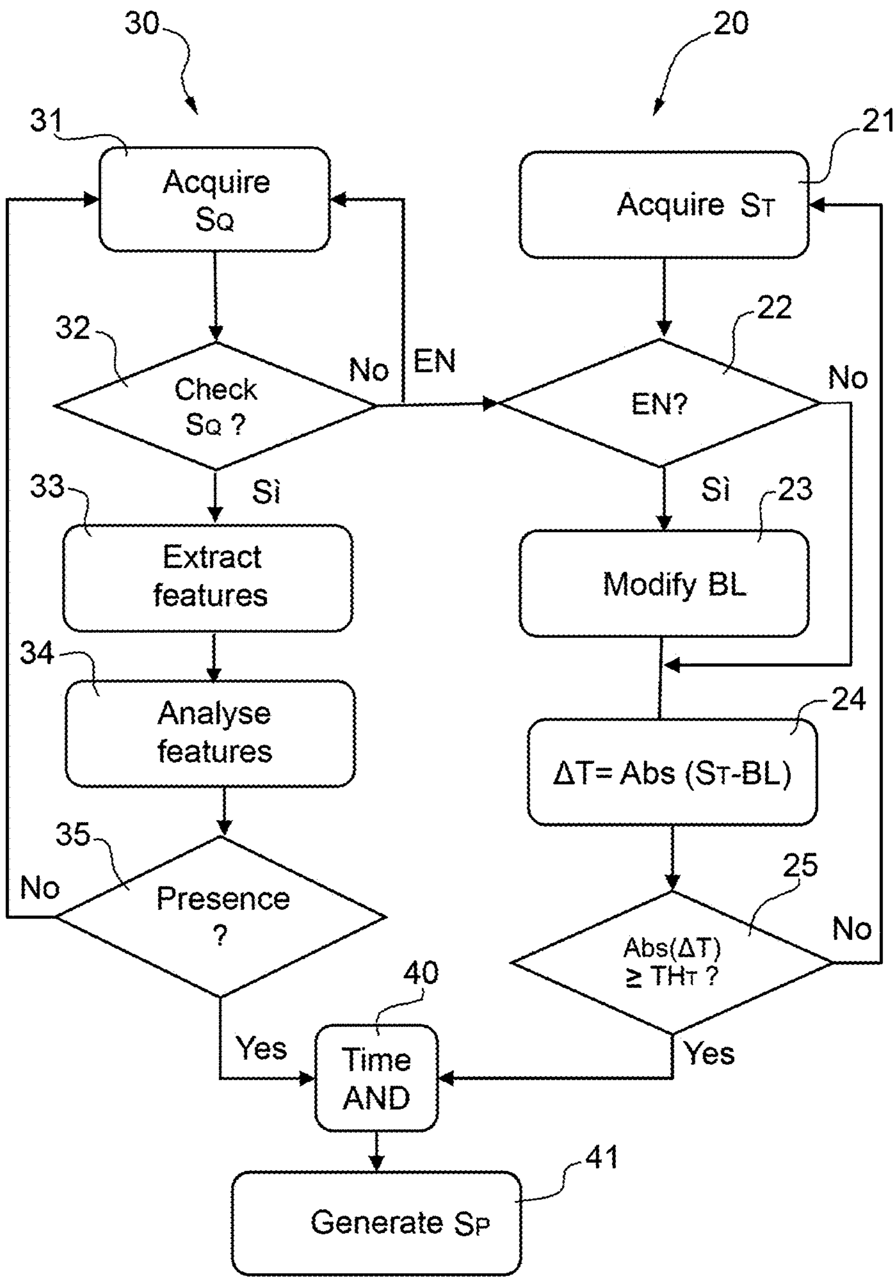
FIG. 4 illustrates a flowchart of a method implemented by the detection device of FIG. 2, according to one embodiment of the present solution.

FIG. 4 illustrates, as a flowchart, the operations of joint processing of the charge-variation and temperature-variation signals $S_Q$, $S_T$ carried out by the processing unit 6, in a possible embodiment of the present solution.

In particular, as will be in any case highlighted hereinafter, the processing unit 6 is configured to carry out in parallel (i.e., in a way substantially simultaneous over time) two distinct processing branches, a first processing branch 20 and a second processing branch 30, respectively for processing the temperature signal $S_T$ and the charge-variation signal $S_Q$ (in the embodiment described, both signals being of a digital type), to detect the presence of at least one individual in the monitored area, on the basis, in combination, of the results supplied by the aforementioned processing branches.

The processing branches 20, 30 are executed continuously over time, within a respective cyclic loop.

In detail, the first processing branch 20 envisages, in an initial step (block 21), acquisition of a new value or sample (or of a set of values or samples) of the temperature signal $S_T$.

Next, at block 22, an update of a baseline value BL of the temperature signal $S_T$ is enabled (or not enabled), as a function of, and in a way conditioned to, an enable signal EN received from the second processing branch 30. As will be described in detail hereinafter, the value of this enable signal EN is indicative of the presence, or absence, of individuals in the monitored area, as determined from the processing of the charge-variation signal $S_Q$.

In particular, in the case where updating is enabled (in the absence of individuals in the monitored area), at block 23, the baseline value BL is updated, in a per se known manner, for example by updating of a moving-window average or by implementation of an appropriate filter, for example of a low-pass type with a suitable time constant, designed to supply at the output the aforementioned baseline value BL.

Updating of the baseline value BL enables automatic adjustment of the temperature detection made by the infrared temperature sensor 2 to the environmental conditions and to the possible variations thereof (for example, on account of turning-on or activation of an external heat source or of any other source of noise). In particular, given that the aforementioned enable signal EN is indicative of the absence of individuals in the monitored area, updating of the baseline value BL can be carried out in an optimized way with dedicated operations, for example as regards the speed of response of the aforementioned moving average and/or filtering operations, without problems of interference with the possible detection of presence of individuals in the same monitored area.

Then, at block 24, the value of a temperature difference (or gradient) ΔT is calculated as the difference, in absolute value, between the value of the temperature signal $S_T$ and the aforementioned baseline value BL (possibly appropriately updated, as discussed previously).

As represented by block 25, this temperature gradient ΔT is compared, in absolute value, with a temperature threshold $TH_T$, of a pre-set value, indicative of the variation of the temperature signal $S_T$ associated with the presence of at least one individual in the monitored area (the value of this temperature threshold $TH_T$ can be determined beforehand or in an initial characterization step).

If the temperature gradient ΔT is, in absolute value, lower than the temperature threshold $TH_T$, processing returns to block 21, to calculate a new value of the same temperature gradient (considering the subsequent value, or a set of subsequent values, of the temperature signal $S_T$).

If, instead, the temperature gradient ΔT is, in absolute value, equal to or higher than the temperature threshold $TH_T$, the first processing branch 20 provides a first presence indication, indicative of the presence of at least one user in the monitored area.

In parallel, the second processing branch, designated by 30, envisages, as represented by block 31, continuously over time within a respective cyclic loop, acquisition and processing of the charge-variation signal $S_Q$ (possibly preliminarily subjected to appropriate filtering actions).

In particular, at block 32, firstly a preliminary check of the charge-variation signal $S_Q$ is carried out in order to identify a significant variation thereof with respect to a reference (or baseline) value.

In one embodiment, this preliminary check can be carried out by means of a comparison of the charge-variation signal $S_Q$ with a charge threshold $Th_Q$. This charge threshold $Th_Q$ may be fixed and pre-set, or, alternatively, may be of an adaptive type, i.e., variable as a function of the evolution of the charge-variation signal $S_Q$. Calculation of the charge threshold $Th_Q$ of an adaptive type can be carried out by exploiting techniques known in the art; for example, it is possible to use sliding time windows or overlapping time windows, or again other techniques for real-time adaptive-threshold calculation.

In a possible embodiment, the charge threshold $Th_Q$ can be chosen as the average of the charge-variation signal $S_Q$ (in the time window considered) plus a multiple of the standard deviation of the same charge-variation signal $S_Q$ (in the same window considered):

$$Th_Q = \text{mean}(S_Q) + n \cdot \text{stddev}(S_Q),$$

with “n” chosen in the range between 2 and 6, for example 4 (where “mean” is the operation of arithmetic mean, and “stddev” is the operation of standard deviation). The time window is chosen with an appropriate value, according to the type of application; the Applicant has found that values compatible with processing on a microcontroller (i.e., taking into account the buffer, the memory used, and the calculation resources), can range from 2 to 10 seconds.

If the preliminary check on the charge-variation signal $S_Q$ does not lead to identification of a significant variation, processing returns to block 31, for a new processing cycle of the charge-variation signal $S_Q$.

In addition, once again in the case where the aforementioned significant variation of the charge-variation signal $S_Q$ is not identified, the enable signal EN (for example, of a high value) is provided to the first processing branch 20 (at block 22) to enable modification and automatic updating of the baseline value of the temperature signal $S_T$ (as previously discussed).

If, instead, the aforementioned significant variation of the charge-variation signal $S_Q$ is identified, the aforementioned automatic updating of the baseline value of the temperature signal $S_T$ is disabled (the enable signal switches, for example, to the low value) and a further and more in-depth analysis of the charge-variation signal $S_Q$ is carried out in order to verify the presence of features that are indicative of the presence of at least one individual in the monitored area.

This further analysis may envisage, in a simpler embodiment (and one that is less burdensome from the computational standpoint) identification of (positive and/or negative) peaks in the evolution of the charge-variation signal $S_Q$ with respect to a reference value, due to the transfer of electrostatic charges from or towards the ground as a result of the presence of the individual in the monitored area.

As will be highlighted also hereinafter, the Applicant has in fact verified the possibility of identifying peaks in the charge-variation signal $S_Q$ at each step made by the individual, as a result of the aforementioned transfer of charges from the body of the individual from or towards the ground.

In a different embodiment, illustrated in the aforementioned FIG. 4, which is more burdensome from the computational standpoint but ensures a better accuracy in the step detection, the aforementioned further analysis of the charge-variation signal $S_Q$ can be carried out by means of a dual step of extraction of significant features of the charge-variation signal $S_Q$, block 33, and of analysis of the features extracted, block 34.

The aforementioned significant features characterize the evolution of the charge-variation signal $S_Q$, for example of a corresponding envelope, and may be identified and detected via processing of the same charge-variation signal $S_Q$. Advantageously, to carry out the aforementioned operations of feature extraction and analysis it is possible to use automatic-learning artificial-intelligence algorithms of the so-called machine-learning type, appropriately trained, for example by means of neural networks, SVMs, Bayesian networks, etc.

In any case, on the basis of the aforementioned further analysis, the presence, or absence, in the charge-variation signal $S_Q$, of features indicative of the presence of at least one individual is verified, at block 35.

If the features are not present, a subsequent cycle of processing of the charge-variation signal $S_Q$ is envisaged (in the example, the process returns to the aforementioned block 31).

If the features are present, a second presence indication is provided, regarding the presence of at least one individual in the monitored area.

Next, at block 10, processing envisages verifying the simultaneous presence, i.e., the presence substantially at the same instant or time interval, of the aforementioned first and second indications, in order to validate (in the case of positive verification of the simultaneous presence) the detection of the presence of at least one individual in the monitored area. In other words, in block 40 an operation of (time) AND is carried out between the first and second presence indications, thus reinforcing the presence indication supplied, individually, by the infrared temperature sensor 2 and by the charge-variation sensor 4.

It is highlighted that the aforementioned operation of time AND may, for example, be performed as described in the Italian Patent Application 102020000001603 filed on 28 Jan. 2020 in the name of the present Applicant.

It is moreover highlighted that a certain delay (for example, of the order of some tens of milliseconds) between the two detections of the first and second indications is in any case acceptable, given that it falls within the normal delay of generation, acquisition and processing of the two signals (by means of operations carried out with procedures different from one another).

In the case where the simultaneous presence of the first and second indications is verified, the process passes from block 40 to block 41, where a presence signal $S_P$ is generated at the output, indicative of the detected presence of at least one individual in the monitored area. The presence signal $S_P$ may, in particular, be a signal that assumes a first value (for example, a high value) throughout the time interval within which at least one individual enters, and remains within, the monitored area.

Figure 5:
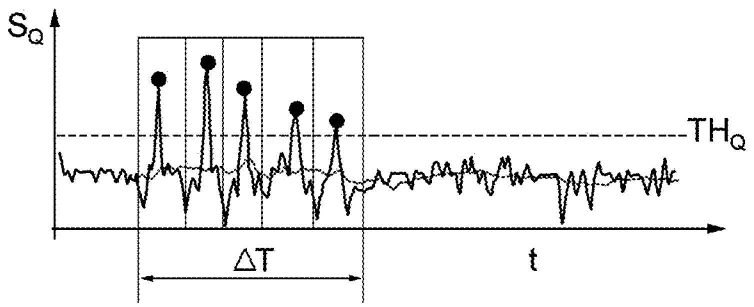
FIG. 5 shows a plot of an electrostatic-charge-variation signal associated with the detection of at least one individual in a monitored area.

FIG. 5 shows the evolution of the charge-variation signal $S_Q$ during a series of steps made by an individual within the monitored area, occurring, as illustrated schematically, in the time interval identified by $\Delta T$. In particular, it is evident that, for each step a peak (indicated by a dot) and moreover a characteristic evolution (indicated by a rectangular box) occur in the charge-variation signal $S_Q$, which can therefore be identified by means of processing of the signal by the processing unit 6.

FIG. 5 also indicates the charge threshold $Th_Q$, which is, for example, calculated in an adaptive manner with respect to the evolution of the charge-variation signal $S_Q$, in particular with respect to a baseline value of the charge-variation signal $S_Q$ (which is also represented in FIG. 5); the peaks are therefore referenced in this case to the aforementioned charge threshold $Th_Q$.

It is moreover evident that, outside the aforementioned time interval $\Delta T$, i.e., in the absence of individuals within the monitored area, the charge-variation signal $S_Q$ has significantly different features, and in particular an amplitude lower than the charge threshold $Th_Q$. In this time interval, as discussed previously, updating of the baseline value of the temperature signal $S_T$ is therefore enabled.

Figure 6:
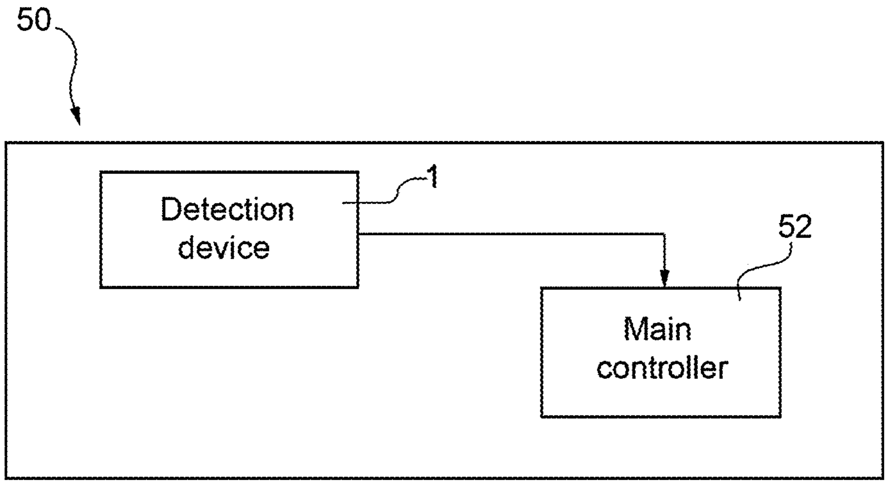
FIG. 6 is a general block diagram of an electronic apparatus in which the detection device of FIG. 2 can be used.

FIG. 6 is a schematic illustration of an electronic apparatus 50 that includes the detection device 1 described previously.

The electronic apparatus 50 comprises a main controller 52 (a microcontroller, a microprocessor, or a similar digital processing unit), coupled to the processing unit 6 of the detection device 1 in order to receive the information regarding the presence of at least one individual in the monitored area.

In the embodiment described previously, the main controller 52 receives from the processing unit 6 of the detection device 1 the presence signal $S_P$, for example in order to activate an appropriate anti-intrusion alarm (or serving other purposes, for example for energy saving, or for domestic or industrial automation).

The advantages achieved by the present solution emerge clearly from the foregoing description.

In any case, it is again underlined that, in the detection device 1, monitoring of the charge variation allows to reinforce the information associated with the sole temperature detection made by the infrared temperature sensor.

The detection device 1 enables a performance optimization (in particular, reducing the number of false detections, i.e., false positives and false negatives, due to the presence of noise due to heat sources or electrostatic charges in the environment), with an optimized energy consumption and a small occupation of space (in particular, with the possibility of integration in a single package of both detection technologies, namely, the temperature detection and the charge-variation detection).

As described previously, it is advantageous the possibility to use the presence indication provided by processing of the charge-variation signal $S_Q$ for enabling, or not, updating of the baseline value BL of the temperature signal $S_T$ so as to eliminate (or markedly reduce) the false detections associated with environmental noise.

In addition, advantageously, processing of the features of the charge-variation signal $S_Q$ enables discrimination with a high reliability of the presence of individuals or pets within the monitored area. In particular, the presence of pets does not generally lead to generation of the second presence indication by the second processing branch 30; at most, the presence of pets can lead to generation of a signal with smaller amplitude (which therefore can be filtered out with a sufficiently high threshold) or with features that are different, as regards shape and frequency, from those associated with the detection of human presence.

Finally, modifications and variations may be applied to the present solution, without thereby departing from the scope specified in the claims.

In particular, in a way not illustrated, appropriate filtering operations may be envisaged (for example, using low-pass or high-pass filters) for the temperature and charge-variation signals $S_T$, $S_Q$, preliminary to the processing operations described. This filtering may have the function of "cleaning-up" the temperature and charge-variation signals $S_T$ and $S_Q$ from noise or components of disturbance at non-significant frequencies (e.g., around 50 Hz or 60 Hz for the charge-variation signal $S_Q$). It is moreover possible to carry out a frequency analysis (e.g., by means of Fast Fourier Transform—FFT) of the charge-variation signal $S_Q$ in order to identify the features thereof for recognizing whether the individual is going upstairs or downstairs and the relative number of steps.

In a way not illustrated, the detection device 1 can integrate further sensors and envisage further processing channels dedicated to other detections.

Moreover, in one embodiment, the charge-variation sensor 4 may be arranged in a manner delocalized with respect to the temperature sensor 2. In this case, the detection device 1 is not integrated within a single package, and, for example, a wireless communication may be envisaged between the control unit 6 and the charge-variation sensor 4.

The above embodiment may be advantageous, for example, for orienting the monitoring area of the charge-variation sensor 4 in a specific way towards known sources of disturbance (for example, constituted by heat sources, whose switching-on could be interpreted as the presence of an individual in the monitored area).

In various embodiments, the methods described herein may be implemented, at least in part, using a processor coupled to a non-transitory computer readable medium, such as a memory. The non-transitory computer readable medium may include instructions executable by the processor to implement embodiment algorithms. The processor may include a central processing unit (CPU), a microprocessor, a microcontroller or other processing circuitry known in the art that is capable of executing machine readable instructions. In alternative embodiments, the methods described herein may be implemented using dedicated digital logic, programmable digital logic such as a field programmable gate array (FPGA), a digital signal processor (DSP), or other suitable digital hardware.

Furthermore, it is underlined that the detection device 1 may comprise a different sensor for providing the temperature-variation signal used in combination with the charge-variation signal for presence detection, for example, an infrared temperature sensor of an active type.

What is claimed is:

1. A detection device, comprising:
- a processor configured to:
  - receive, from an infrared temperature sensor, a temperature signal associated with an heat emission of at least one individual within a monitored area;
  - receive, from an electrostatic-charge-variation sensor, a charge-variation signal indicative of a variation of electrostatic charge associated with the at least one individual;
  - jointly process the temperature signal and the charge-variation signal; and
  - detect a presence of the at least one individual within the monitored area based on jointly processing the temperature signal and charge-variation signal.

2. The detection device according to claim 1, wherein the processor is further configured to:
- process a temperature gradient associated with a variation of the temperature signal with respect to a baseline value in order to detect a first presence indication;
- process a variation over time of the charge-variation signal in order to detect a second presence indication; and
- generate a presence signal indicative of the presence of the at least one individual within the monitored area when both the first presence indication and the second presence indication indicate the presence of the at least one individual in a same time interval.

3. The detection device according to claim 2, wherein:
- the first presence indication indicates the presence of the at least one individual when the temperature gradient exceeds, in absolute value, a temperature threshold; and
- the second presence indication indicates the presence of the at least one individual when features of the charge-variation signal is associated with at least one step made by the at least one individual.

4. The detection device according to claim 3, wherein the processor is configured to determine whether the features of the charge-variation signal is associated with at least one step made by the at least one individual by:
- determining whether amplitude peaks of the charge-variation signal exceed a fixed or adaptive charge threshold; or
- analyzing specific patterns of the charge-variation signal, and determining whether the analyzed specific patterns of the charge-variation signal are indicative of the presence of the at least one individual.

5. The detection device according to claim 2, wherein the processor is configured to enable updating of the baseline value of the temperature signal for automatically adapting the detection to conditions of ambient temperature of the monitored area, conditionally with respect to the processing of the charge-variation signal.

6. The detection device according to claim 5, wherein the processor is configured to enable updating of the baseline value of the temperature signal, only in a case where processing of the charge-variation signal over time is indicative of an absence of individuals in the monitored area.

7. The detection device according to claim 5, wherein the processor is configured to enable updating of the baseline value of the temperature signal when the charge-variation signal varies within a charge threshold.

8. The detection device according to claim 1, further comprising the electrostatic-charge-variation sensor, wherein the electrostatic-charge-variation sensor comprises:
- at least one electrode configured to be arranged facing the monitored area;
- a high-impedance instrumentation amplifier having an input coupled to the electrode, the high-impedance instrumentation amplifier comprising
  - a resistor network,
  - a first amplifier having a first input coupled to the electrode and a second input coupled to the resistor network, and
  - a second amplifier having a first input coupled to a reference voltage node and a second input coupled to the resistor network; and
- an analog-to-digital converter coupled to the resistor network of the high-impedance instrumentation amplifier for providing the charge-variation signal.

9. The detection device according to claim 1, further comprising a filter configured to filter the temperature signal or the charge-variation signal.

10. An electronic apparatus comprising:
- the detection device according to claim 1; and
- a main controller coupled to the processor of the detection device, the main controller configured to receive a presence signal indicative of the presence of the at least one individual within the monitored area from the processor of the detection device.

11. The electronic apparatus according to claim 10, wherein the main controller is configured to activate an anti-intrusion alarm based on the presence signal.

12. A method for detecting a presence of at least one individual within a monitored area, comprising:
- receiving, from an infrared temperature sensor, a temperature signal associated with a heat emission of at least one individual within the monitored area;
- receiving, from an electrostatic-charge-variation sensor, a charge-variation signal indicative of a variation of electrostatic charge associated with the at least one individual; and
- jointly processing the temperature signal and the charge-variation signal to detect the presence of the at least one individual within the monitored area.

13. The method according to claim 12, wherein joint processing comprises:
- processing a temperature gradient associated with a variation of the temperature signal with respect to a baseline value for detecting a first presence indication;
- processing a variation of the charge-variation signal over time for detecting a second presence indication; and
- generating a presence signal indicative of the presence of the at least one individual within the monitored area when the first presence indication and the second presence indication are jointly detected in a same time interval.

14. The method according to claim 13, further comprising enabling updating of the baseline value of the temperature signal for automatic adaptation of the detection to conditions of ambient temperature of the monitored area, conditionally with respect to processing of the charge-variation signal.

15. The method according to claim 14, further comprising enabling updating of the baseline value of the temperature signal only when the processing of the variation of the charge-variation signal indicates an absence of individuals in the monitored area.

16. The method according to claim 14, further comprising:

determining whether the charge-variation signal varies within a charge threshold;

and enabling updating of the baseline value of the temperature signal when the charge-variation signal varies within the charge threshold.

17. The method according to claim 16, wherein the charge threshold is based on a mean and a deviation of the of the charge-variation signal.

18. The method according to claim 12, further comprising:

performing a frequency analysis of the charge-variation signal; and determining whether the at least one individual is going upstairs or downstairs and a relative number of steps.

19. A presence detection system comprising:

a processor configured to:

extract features from a charge-variation signal provided by an electrostatic-charge-variation sensor, determine whether the extracted features match features associated with a human presence, determine a temperature difference of a temperature signal provided by an infrared sensor, determine whether the temperature difference is outside of a first temperature range, and generate a presence detection signal when the extracted features match the features associated with the human presence and the temperature difference is outside of the first temperature range within a same time interval.

20. The presence detection system of claim 19, wherein the processor is further configured to:

determine whether the charge-variation signal provided by the electrostatic-charge-variation sensor varies within a first charge variation range; and update the first temperature range when the charge-variation signal is within the first charge variation range.

21. The presence detection system of claim 19, wherein the processor is configured to extract the features from the charge-variation signal and determine whether the extracted features match the features associated with the human presence using a machine learning algorithm.

* * * * *